United States Patent [19]

Kitaguchi

[11] Patent Number: 4,543,038
[45] Date of Patent: Sep. 24, 1985

[54] SEALING APPARATUS AND METHOD AND MACHINERY UTILIZING SAME

[75] Inventor: Sam S. Kitaguchi, Phoenix, Ariz.

[73] Assignee: The Garrett Corporation, Los Angeles, Calif.

[21] Appl. No.: 647,852

[22] Filed: Sep. 4, 1984

Related U.S. Application Data

[63] Continuation of Ser. No. 355,505, Mar. 8, 1982, abandoned.

[51] Int. Cl.[4] .............................................. F04D 29/10
[52] U.S. Cl. ...................................... 415/112; 415/113; 415/115; 415/173 R; 415/176; 417/406; 277/3; 277/25; 277/59; 277/135; 137/56
[58] Field of Search ................. 415/110-113, 415/115, 173 A, 173 R, 174-176; 417/406-409; 60/39.08, 39.07; 277/25, 135, 3, 59, 29; 137/56

[56] References Cited

U.S. PATENT DOCUMENTS

| | | |
|---|---|---|
| 1,861,275 | 5/1932 | Hopkins . |
| 2,140,356 | 12/1938 | Gutmann . |
| 2,352,336 | 6/1944 | Martin et al. . |
| 2,467,955 | 4/1949 | Berninger . |
| 2,478,649 | 8/1949 | Wightman . |
| 2,662,536 | 12/1953 | Martiniak et al. ............... 137/56 |
| 2,936,715 | 5/1960 | Southam et al. ................. 415/175 |
| 3,042,417 | 7/1962 | Derman et al. . |
| 3,043,561 | 7/1962 | Scheper, Jr. ..................... 415/115 |
| 3,160,416 | 12/1964 | Ryffel ............................ 415/173 A |
| 3,256,027 | 6/1966 | Chapel . |
| 3,578,872 | 5/1971 | McBurnie . |
| 3,712,756 | 1/1973 | Kalikow et al. ................. 137/56 |
| 3,802,515 | 4/1974 | Flamand et al. . |
| 3,870,384 | 3/1975 | Ladin . |
| 3,990,812 | 11/1976 | Radtke ......................... 415/115 X |
| 4,087,198 | 5/1978 | Theis, Jr. . |
| 4,090,821 | 5/1978 | Barrows et al. .................. 137/56 |
| 4,188,780 | 2/1980 | Penny ............................. 137/56 |
| 4,213,738 | 7/1980 | Williams ..................... 415/115 X |
| 4,296,599 | 10/1981 | Adamson .................... 415/115 X |

FOREIGN PATENT DOCUMENTS 278860 10/1927 United Kingdom .

Primary Examiner—Louis J. Casaregola
Assistant Examiner—Jeffrey A. Simenauer
Attorney, Agent, or Firm—Terry L. Miller; Albert J. Miller

[57] ABSTRACT

A shaft sealing apparatus utilizing a flow of sealing fluid to block leakage of a second fluid; and including a valve element controlling the flow of sealing fluid as a function of shaft rotational speed.

32 Claims, 10 Drawing Figures

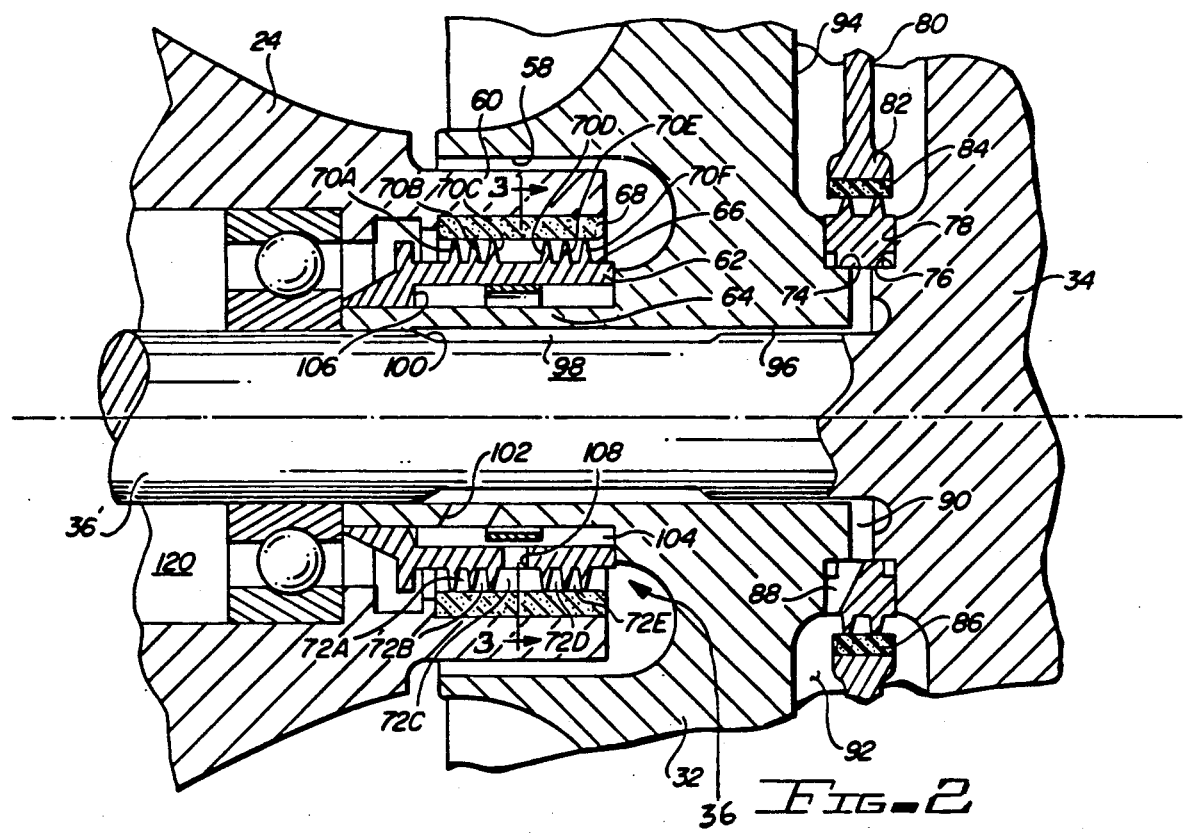
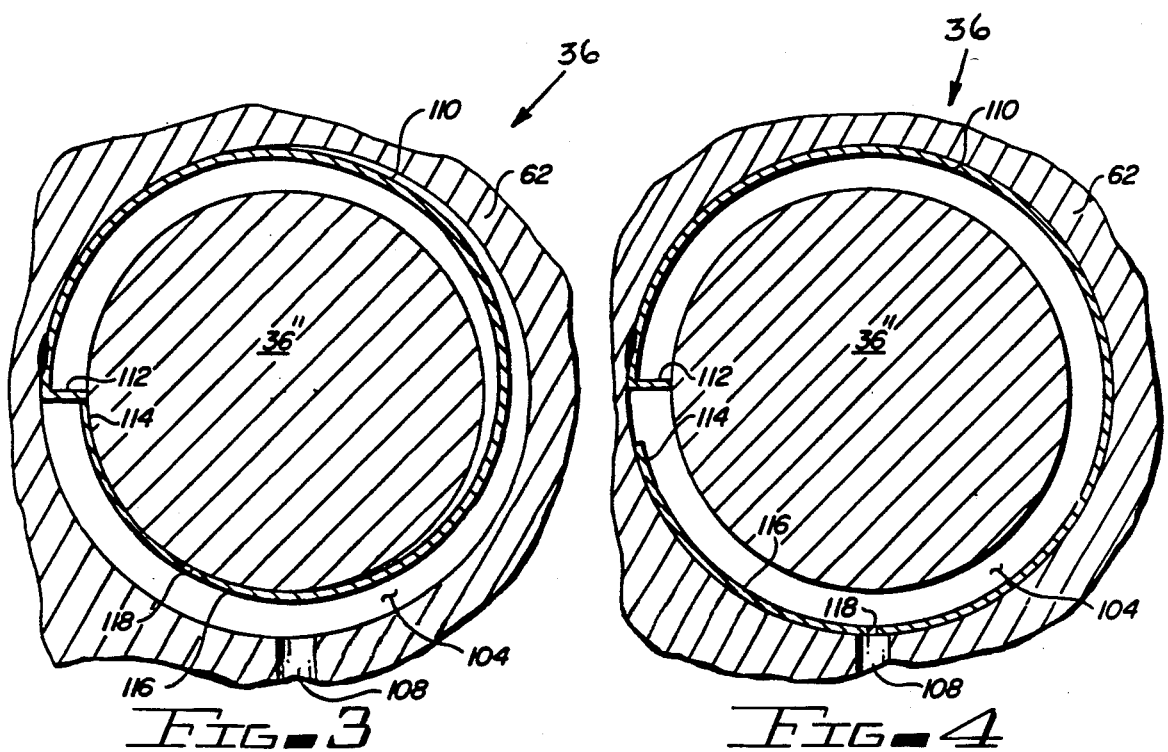

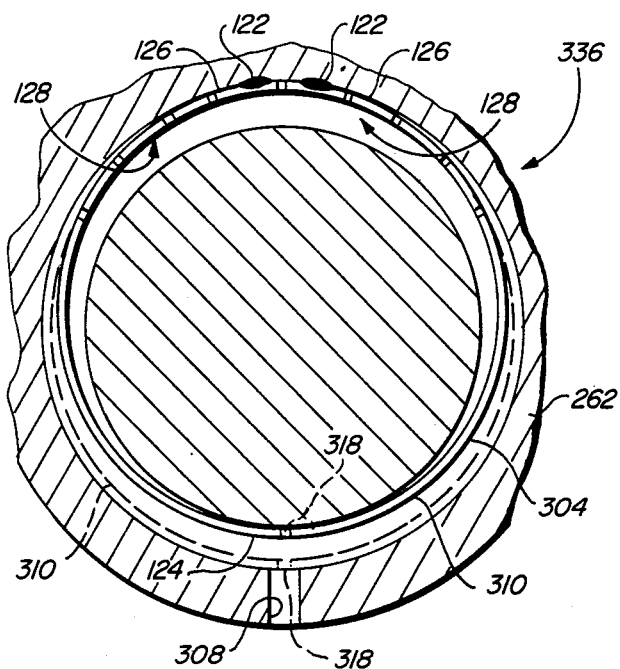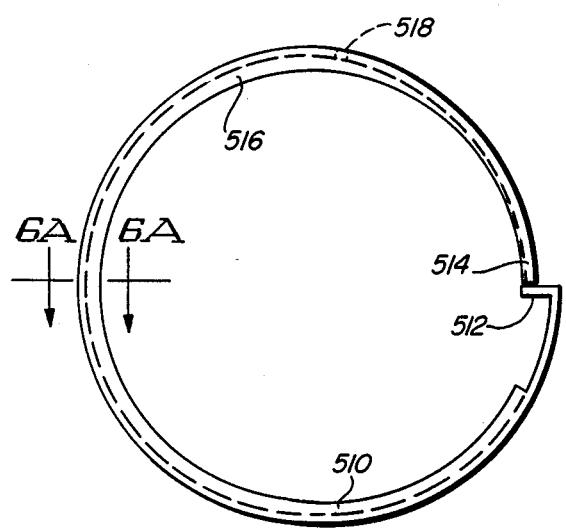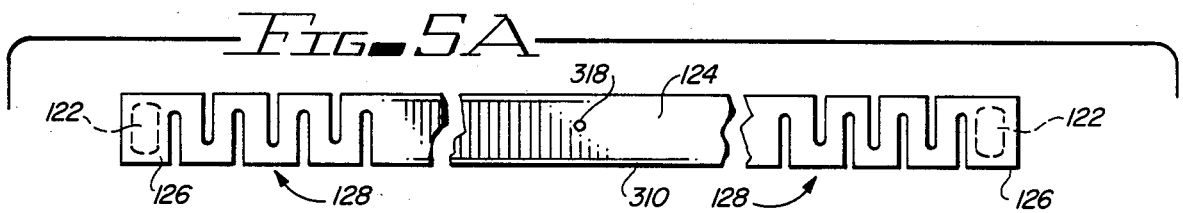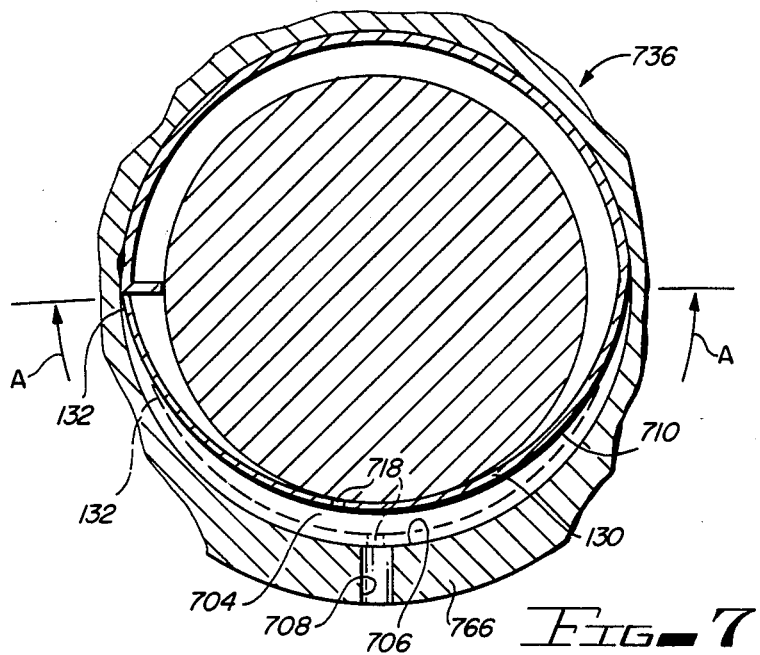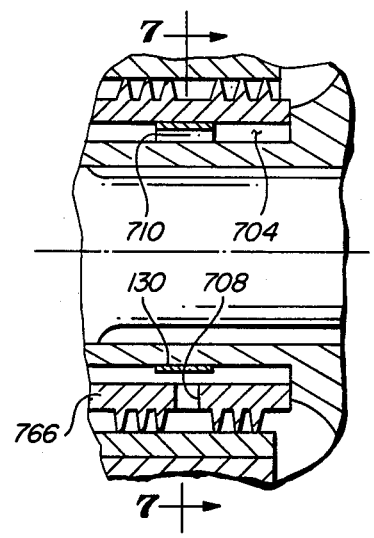

SEALING APPARATUS AND METHOD AND MACHINERY UTILIZING SAME

BACKGROUND OF THE INVENTION

The Government has rights in this invention pursuant to Contract No. DAAK70-80-0257, awarded by the U.S. Army.

This application is a continuation of application Ser. No. 355,505 filed 8 Mar. 1982, now abandoned.

The field of this invention is sealing apparatus and methods for ratary shafts received in housing openings. More particularly, this invention relates to sealing apparatus of the so-called knife edge type which are frequently utilized in highspeed rotary machinery to prevent the leakage of a fluid along a shaft where the shaft penetrates a housing of the machine. Consequently, this invention relates to turbo machinery utilizing so called knife-edge or labyrinth shaft sealing apparatus therein.

The most pertinent conventional shaft sealing or packing apparatus known to the applicant are illustrated in U.S. Pat. Nos. 1,861,275; 2,140,356; 2,352,336; 2,467,955; 2,478,649; 3,042,417; 3,256,027; and 3,870,384.

However, these conventional shaft sealing apparatus present many recognized deficiencies; particularly when they are applied to high-speed turbo machinery. Among these deficiencies are shaft or housing wear caused by rubbing friction and a sensitivity of the sealing apparatus to shaft eccentricity or vibration.

This latter deficiency may result in leakage of fluid past the seal and can exacerbate the problem of rubbing friction within conventional sealing apparatus. Consequently, these conventional shaft sealing apparatus are deemed less than satisfactory for application to hiqh-speed turbo machinery because of the vibration and differential thermal expansions experienced by such machinery.

SUMMARY OF THE INVENTION

In this invention a housing defines a circular bore rotatably receiving a shaft means. A circumferentially extending wall of the bore is spaced radially outwardly from the shaft means to define an axially extending annular clearance. One of the housing wall and shaft means define at least a pair of radially and circumferentially extending knife-edge elements extending toward but short of the other of the housing wall and shaft means. The pair of knife-edge elements cooperate with the wall and shaft means to define an annular chamber. A flow of pressurized expendable sealing fluid from a source thereof is introduced into the annular chamber via a passage defined within the shaft means. The sealing fluid flows axially out of the annular chamber via small clearances between the knife-edge elements and the other of the shaft means and wall. Consequently, the flow of expendable sealing fluid prevents the leakage of a non-expendable fluid through the bore between the shaft means and wall. A centrifugally responsive valve element is disposed in the passage to control the flow of the sealing fluid as a function of shaft means speed.

In a specifically disclosed preferred embodiment of the invention, a turbo machine includes a housing including a circumferentially extending wall defining a circular bore. A shaft means is rotatably received in the bore and defines an outer surface spaced radially inwardly from the wall of the housing. The shaft means carries a multitude of circumferentially extending and axially spaced apart knife-edge elements extending radially outwardly toward but short of the housing wall. The knife-edge elements cooperate with the shaft means and wall to define a multitude of axially adjacent annular chambers circumscribing the shaft means. A passage defined by the shaft means opens to a central one of the annular chambers and leads to a source of pressurized expendable sealing fuid. A centrifugally responsive valve element is carried by the shaft means to control the flow of pressurized sealing fluid to the central annuar chamber as a function of shaft means rotational speed.

According to a further aspect of the specifically disclosed preferred embodiment of the invention, the passage within the shaft means of the turbo machine opens to a chamber defined between a compressor wheel and a turbine wheel of the turbo machine. A sealing member bounds the chamber and defines a passage opening to the chamber and leading to the discharge area of the compressor wheel. Thus, the compressor wheel of the turbo machine provides the source of pressurized sealing fluid to the central annular chamber via the passage in the shaft means and the valve element.

BRIEF DESCRIPTION OF THE DRAWINGS

FIG. 2 depicts an enlarged fragmentary view of an encircled portion of FIG. 1;

FIG. 3 is a fragmentary cross sectional view taken along line 3—3 of FIG. 2 having non-essential structural detail omitted for clarity of illustration;

FIG. 4 depicts a cross sectional view similar to FIG. 3 and also having non-essential structural detail omitted for clarity of illustration and showing parts of the invention in an alternative operative position;

FIG. 5 depicts a fragmentary cross sectional view similar to FIG. 3 and illustrating an alternative embodiment of the invention;

FIG. 5A illustrates a component part of the embodiment of the invention depicted by FIG. 5;

FIG. 6 depicts an isolation view of a component part of yet another embodiment of the invention;

FIG. 6A illustrates a cross sectional view taken along line 6A—6A of FIG. 6; and FIGS. 7 and 7A illustrate fragmentary views of still another alternative embodiment of the invention and are similar to FIGS. 2–4.

DETAILED DESCRIPTION OF THE PREFERRED EMBODIMENTS

Figure 1:
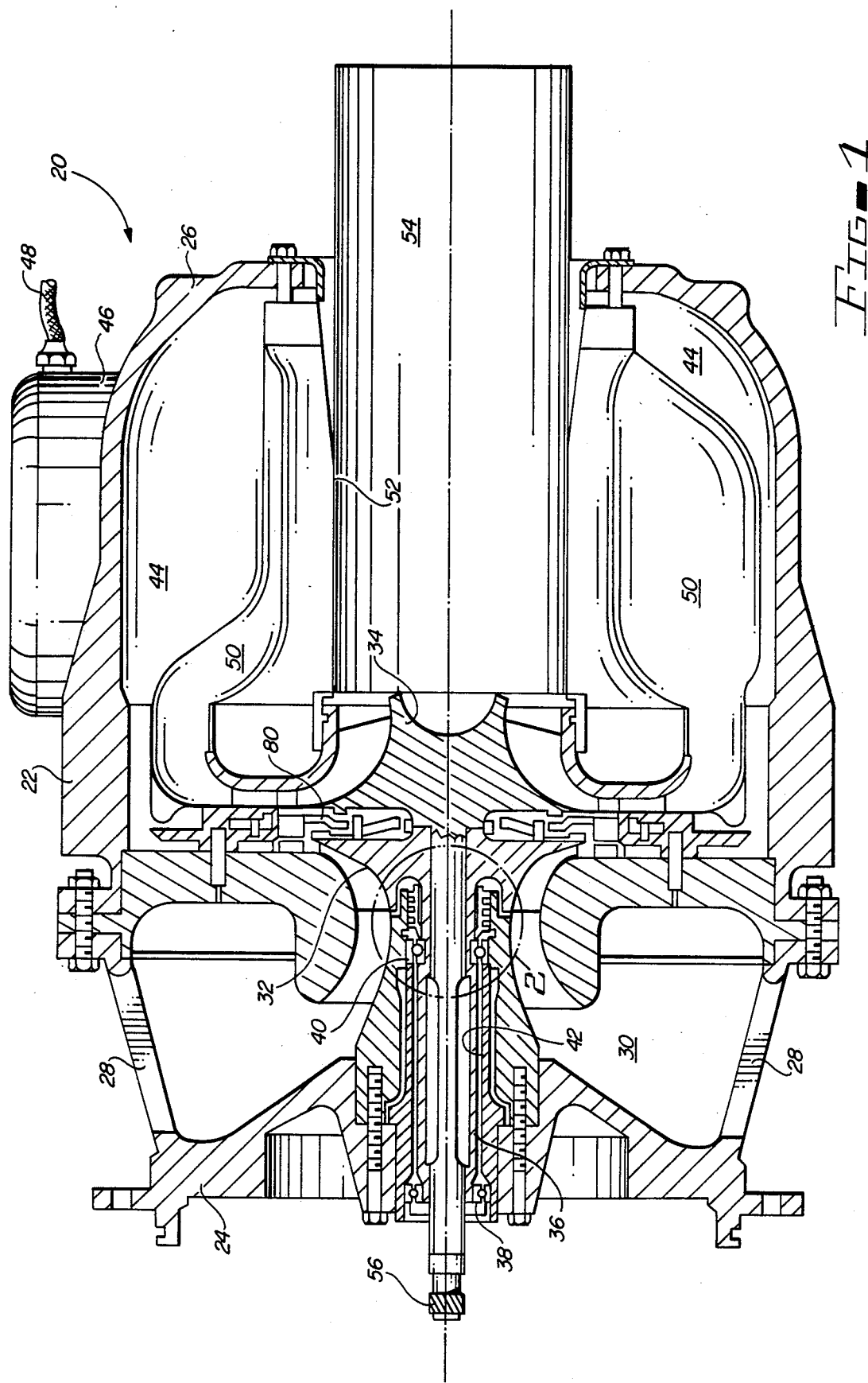
FIG. 1 depicts a longitudinal cross sectional view of a turbo machine according to one preferred embodiment of the invention.

FIG. 1 illustrates a turbo machine 20 including a housing 22. The housing 22 includes a first part 24 and a second part 26 which are connected by a multitude of circumferentially spaced struts 28 (only two of which are visible in FIG. 1). The housing parts 24 and 26 cooperate to define an annular air inlet 30 leading radially inwardly and axially to a centrifugal compressor wheel 32. The compressor wheel 32 and a radial inflow turbine wheel 34 are carried by a shaft assembly 36. A pair of bearings 38 and 40 journal the shaft assembly 36 and are received by a bore 42 defined by the first housing part 24.

When the compressor wheel 32 is rotated it draws in atmospheric air at inlet 30 and discharges pressurized air to an annular discharge chamber 44 defined within the second housing part 26. Chamber 44 communicates with a combustor 46 (only a portion of which is visible in FIG. 1). The combustor 46 receives pressurized air from the chamber 44 along with fuel via a conduit 48 to maintain combustion producing a supply of hot, pressurized combustion products. An annular chamber 50 defined within the chamber 44 receives the combustion products from the combustor 46 and leads to the turbine wheel 34. An inner circumferentially extending wall 52 of the housing part 26 defines an exhaust duct 54 leading from the turbine wheel 34 to the atmosphere.

When the turbo machine 20 is operating, combustion products from the chamber 50 cause the turbine wheel 34 to spin at a high rate of speed. The turbine wheel 34 drives the shaft assembly 36, which in turn drives the compressor wheel 32. The shaft assembly 36 includes a splined end portion 56 for connection with a power-absorbing device (not shown).

Turning now to FIG. 2, it will be seen that the compressor wheel 32 defines an axially extending annular recess 58. The housing part 24 includes a circumferentially extending wall 60 which extends axially into the recess 58. Shaft assembly 36 comprises a central portion 36' which is integrally formed with turbine wheel 34 and carries compressor wheel 32. A sleeve-like seal member 62 is carried upon an axially extending central portion 64 of the compressor wheel 32. The central portion 64 defines a part of shaft assembly 36. The seal member 62 also forms a part of the shaft assembly 36 and defines an outer surface 66 which is spaced radially inwardly from the wall 60. In view of the above, it will be appreciated that shaft assembly 36 includes central portion 36' as well as seal member 62 and central portion 64 of compressor wheel 32. That is, the shaft assembly 36 comprises relatively rotatable shaft means received in the housing 22. A sleeve of abradable material 68 is carried by the wall 60 and confronts the surface 66 of the seal member 62. The seal member 62 defines a multitude of circumferentially extending and axially spaced apart knife-edge seal elements 70A-F extending radially outwardly toward but short of the sleeve of abradable material 66. The knife-edge seal elements 70A-F cooperate with the surface 66 and with sleeve 68 to define a series of axially adjacent annular chambers 72A-E. The annular chambers 72A-E are substantially separated from each other by the knife-edge elements but are in fluid communication because of a slight radial clearance between the knife-edge elements 70A-F and the sleeve 68.

Further examination of FIG. 2 will reveal that the compressor wheel 32 and turbine wheel 34 are axially spaced apart and each defines a respective annular shoulder, 74 and 76, which confront one another. An annular knife-edge seal member 78 is carried upon the shoulders 74, 76. The housing 22 includes an annular partition member 80 extending radially inwardly between the compressor wheel 32 and turbine wheel 34 in order to prevent the flow of pressurized air from the compressor 32 to the turbine 34 except by way of the combustor 46. The partition member 80 includes an enlarged annular boss 82 defining an opening 84. A sleeve of abradable material 86 is received in the opening 84 and sealingly cooperates with the seal member 78.

The seal member 78 defines a notch 88 opening from the side of partition member 80 facing compressor wheel 32 and leading to an annular chamber 90 defined between the turbine wheel 34 and compressor wheel 32. The notch 88 communicates with the compressor discharge area (chamber 44) of the compressor wheel 32 via an annular clearance space 92 defined between a back face 94 of the compressor wheel 32 and the partition member 80. An annular passage 96 leads from the chamber 90 to an annular chamber 98 defined by cooperation of portion 64 with a circumferential groove 100 on the central portion 36' of shaft assembly 36. A radially extending passage 102 opens from the chamber 98 to an annular chamber 104 defined by an annular recess 106 on the seal member 62. A radially extending passage 108 defined by the seal member 62 communicates the chamber 104 to a central one 72C of the chambers 72A-E.

Viewing FIG. 3, the central portion 36' of shaft assembly 36 along with central portion 64 of compressor wheel 32 are schematically depicted together and referenced with numeral 36'', and it will be seen that an arcuate valve element 110 is disposed within the annular chamber 104. The valve element 110 comprises a length of resilient shaperetaining strip material having one end portion 112 bent to extend radially inwardly toward the central portion of shaft assembly 36. By way of example, the valve element 110 may be formed from a strip of spring steel. The valve element 110 is secured to the sealing member 62 adjacent the end portion 112, as by spot welding. The valve element 110 normally defines a spiral shape within the chamber 104 because of the inherent resilience of the material from which the valve element is formed so that another end 114 of the valve element is biased against and rests upon the one bent end portion 112. Consequently, an intermediate portion 116 of the valve element is spaced away from the seal member 62 so that the passage 108 is substantially unobstructed.

When the turbo machine 20 is in operation at normal speed, the shaft assembly 36 rotates at a high rate of speed. Consequently, centrifugal force acting upon the valve element 110 flings the valve element outwardly into engagement with the seal member 62, as is illustrated in FIG. 4. In this position of the valve element, a flow restricting metering orifice 118 defined by the valve element aligns with the passage 108. Consequently, a predetermined flow rate of pressurized air from compressor wheel 32 is communicated into the chamber 72C. The pressurized air reaches the chamber 72C via space 92, notch 88, chamber 90, passage 96, chamber 98, passage 102, chamber 104, metering orifice 118, and passage 108. From the chamber 72C, the pressurized air flows in both axial directions via clearances between the knife edge elements and the sleeve 68. Pressurized air flowing rightwardly from the chamber 72C escapes eventually into the low pressure area in the inlet 30 upstream of the compressor wheel 32. Similarly, pressurized air flowing leftwardly from the chamber 72C communicates to a chamber 120 defined within the bore 42. The chamber 120 is supplied with a flow of lubricating oil during operation of the turbo machine 20 to cool and lubricate the bearings 38 and 40. The pressurized air flowing from chamber 72C past the knife edge elements 70A-C to chamber 120 prevents the lubricating oil in chamber 120 from being drawn into the low pressure area of inlet 30. From the chamber 120, the lubricating oil and air are scavenged to an oil sump (not shown) where the air is separated from the oil and vented.

The size of orifice 118 is selected to allow an appropriate predetermined air flow rate from compressor wheel 32 to chamber 72C at normal design speed operation of the turbo machine 20. Thus, leakage of lubricating oil into the inlet 30 is prevented while minimizing the amount of pressurized air bled from the compressor wheel for this purpose.

During start-up and spin-down of the turbo machine 20, the compressor wheel 32 maintains a low pressure area in the inlet 30 even though it does not develop its design pressure ratio because it is operating off its design speed. As a result, the orifice 118 may allow an insufficient air flow rate from the compressor wheel 32 to chamber 72C so that leakage of lubricating oil into the inlet 30 is possible.

In order to prevent leakage of oil into the inlet 30, the thickness, weight and resilience of the valve element 110 are selected so that the inherent resilience of the valve element moves it from its position illustrated in FIG. 4 to that illustrated in FIG. 3 at a selected rotational speed during spin-down of the turbo machine. Thus, the full flow area of passage 108 is made available for air flow into the chamber 72C. As a result, a sufficient air flow is maintained into the chamber 72C to prevent oil leakage despite the lower air pressure supplied by the compressor wheel 32.

During start-up of the turbo machine 20, the valve element remains in its FIG. 3 position to allow air flow through the full area of passage 108 during low-speed operation of the compressor wheel 32. At substantially the preselected speed, the resilience of the valve element is overcome by centrifugal force so that the valve element moves to its FIG. 4 position to prevent excess air flow to the chamber 72C.

FIG. 5 and 5A illustrate an alternative embodiment of the invention wherein features analogous to those described supra are referenced with the numeral used previously and increased by 200. Viewing FIGS. 5 and 5A it will be seen that an arcuate valve element 310 is disposed within a chamber 304 and confronts a passage 308. The valve element 310 comprises a strip of shape-retaining resilient material (as seen in FIG. 5A) which is curled into a circular shape (viewing FIG. 5) and secured to a seal member 262 at two locations 122, as by spot welding. The valve element 310 includes a central portion 124 and a pair of opposite end portions 126. The end portions 126 define the securing locations 122. A pair of serpentine-shaped elastic sections 128 connect the central portion 124 to the end portions 126 to allow for relative movement therebetween. As is seen in FIG. 5, the valve element 310 in its normal position is disposed with its central portion 124 spaced from the passage 308 so that the full area of the passage is available for the flow of pressurized air into the chambers of a knife-edge seal. When the rotational speed of the shaft assembly 336 is above a predetermined speed, centrifugal force overcomes the shape-retaining resilience of the serpentine sections 128 so that the central portion 124 is flung outwardly into engagement with the seal member 262, (as is illustrated in dashed lines, viewing FIG. 5).

The central portion 124 defines a flow limiting metering orifice 318 which aligns with the passage 308 to control the flow of pressurized air to the knife-edge seal when the speed of shaft assembly 336 is above the predetermined speed. It is easily understood that when the speed of shaft assembly 336 decreases to a level below the predetermined speed, the serpentine resilient sections 128 pull the central portion 124 away from the passage 308 to allow adequate air flow at reduced shaft speeds.

FIGS. 6 and 6A illustrate yet another embodiment of the invention wherein a valve element 510 is configured similarly to the embodiment of FIGS. 1-4. However, the valve element 510 is channel or U-shaped in cross section throughout most of its arcuate length as is illustrated in FIG. 6A. The valve element 510 operates in the same manner as the valve element 110 of FIGS. 1-4. However, the valve element 510 offers a higher ratio of spring rate to mass so that the valve element 510 moves between its two alternative positions at a higher rotational speed. Thus, the configuration of valve element 510 is particularly appropriate for use in turbo machines having a very high design operating speed.

FIGS. 7 and 7A illustrate yet another embodiment of the invention wherein a valve element 710 is configured similarly to the valve element 110 of FIGS. 1-4 and to element 510 of FIGS. 6 and 6A. However, the valve element 710 operates differently than these prior embodiments in order to obtain a high operating speed while using a flat rather than channel cross-sectional shape for the valve element 710. As is seen in FIG. 7A, the valve element 710 is formed of flat strip material similarly to the element 110 of FIGS. 1-4. However, examination of FIG. 7 will reveal that a portion 130 of the valve element 710 (which is delimited by the arc indicated by arrows A) in its normal position defines a radius larger than the radius of recess 706. Consequently, a free end 132 of the valve element 710 engages the seal member 662. When the shaft assembly 736 is rotating, the portion 130 of valve element 710 resists centrifugal force in a manner like a simple beam (albeit, a curved simple beam) which is constrained at its right end and slidably supported at its left end, viewing FIG. 7.

When the shaft assembly 736 reaches a predetermined speed, the valve element 710 shifts to the position illustrated by dashed lines in FIG. 7 to align an orifice 718 with a passage 708 and control the air flow rate to a knife-edge seal. Further, when the rotational speed of the shaft assembly 736 is less than the predetermined speed, the valve element shifts to the position illustrated by solid lines in FIG. 7 to allow adequate air flow to the knife-edge seal via passage 708.

It is apparent in light of the above that this invention relates to both a particular shaft sealing apparatus and method and to devices utilizing the apparatus and method. While the invention has been depicted and described by reference to specific preferred embodiments thereof, no limitation upon the invention is implied because of such reference. The invention is intended to be limited only by the spirit and scope of the appended claims which define the invention. While many modifications and equivalent constructions of the invention will suggest themselves to those skilled in the pertinent art in light of this specification, all such modifications and equivalent constructions of the invention are intended to fall within the scope of the following claims.

I claim:

1. Structure having a housing defining an opening, a relatively rotatable shaft means received in said opening, and a seal apparatus circumscribing said shaft means and cooperating with said housing and said shaft means to substantially prevent leakage of a liquid through said opening in response to a flow of pressurized sealing fluid to said seal apparatus, and centrifugally responsive valve means upstream of said seal apparatus and rotating to control said sealing fluid flow as a function of rotational speed.

2. The invention of claim 1 wherein said shaft means is rotatable and defines flow path means for conducting said flow of sealing fluid to said seal apparatus, said centrifugally responsive valve means being carried by said shaft means for rotation therewith.

3. The invention of claim 2 wherein said shaft means defines a chamber therein, said chamber defining a portion of said flow path means, said valve means including a centrifugally responsive valve element disposed in said chamber, said valve element shifting between a first position and a second position in response to centrifugal force to control said flow of sealing fluid.

4. The invention of claim 3 wherein said chamber is annular, said valve element extending circumferentially within said annular chamber.

5. The invention of claim 4 wherein said valve element comprises an elongate strip of resilient shape-retaining material, said valve element strip including a portion thereof which is spaced radially inwardly of a radially outer wall of said chamber in said first position of said valve element, said portion moving radially outwardly in response to centrifugal force to engage said wall in said second position of said valve element.

6. The invention of claim 5 wherein said wall defines a passage leading to said seal apparatus and defining a part of said flow path means, said passage opening to said chamber on said radially outer wall, said valve element portion spanning said passage opening in said second position of said valve element to control said flow of sealing fluid.

7. The invention of claim 6 wherein said valve element portion defines a flow restricting metering orifice aligning with said passage in second position of said valve element.

8. The invention of claim 6 wherein said valve element strip portion defines a radius which is greater than the radius defined by said radially outer wall of said annular chamber, said elongate valve element strip defining a pair of opposite end sections engaging said radially outer wall, one of said end sections slidably engaging said wall.

9. The invention of claim 6 wherein said valve element elongate strip defines a pair of opposite end sections, said valve element strip being secured to said shaft means adjacent one of said pair of end sections.

10. The invention of claim 9 wherein said pair of end sections are secured to said radially outer wall, said valve element strip including a pair of serpentine-shaped elastic sections, one of said pair of serpentine-shaped elastic sections being interposed between each one of said pair of end sections and said portion to allow relative motion therebetween in response to centrifugal force.

11. The invention of claim 9 wherein said valve element strip in said first position defines a spiral shape within said annular chamber.

12. The invention of claim 11 wherein said one end section extends readially inwardly from said radially outer wall of said annular chamber to define an abutment engageable by the other of said pair of end sections.

13. The invention of claim 12 wherein said valve element strip is substantially U-shaped in transverse cross section.

14. The invention of claim 1 wherein said housing includes an axially and circumferentially extending wall substantially defining said opening, said housing wall being spaced radially outwardly of the radially outer surface of said shaft means to define an axially extending clearance therebetween, said seal apparatus including at least two circumferentially extending and axially spaced apart knife-edge seal elements extending radially between said housing wall and shaft means for cooperating therewith to substantially define an annular chamber circumscribing said shaft means.

15. A turbo machine comprising:
a housing defining a bore;
a rotatable shaft means received in said bore;
a compressor wheel mounted on said shaft means for rotation therewith, said compressor wheel discharging pressurized air to a discharge area;
a sealing structure circumscribing said shaft means and cooperating with said shaft means and said housing to resist leakage therepast of a liquid in response to a flow of pressurized air into a chamber of said sealing structure;
flow path means within said shaft means communicating said compressor discharge area with said chamber of said sealing structure for supplying said flow of pressurized air to the latter; and
centrifugally responsive valve means carried by said shaft means for controlling said flow of pressurized air as a function of shaft means rotational speed.

16. A turbo machine comprising:
a housing defining a bore;
a rotatable shaft means received in said bore;
a compressor wheel mounted on said shaft means for rotation therewith, said compressor wheel discharging pressurized air to a discharge area;
a sealing structure circumscribing said shaft means and cooperating with said shaft means and said housing to resist leakage therepast of a liquid in response to a flow of pressurized air into a chamber of said sealing structure;
flow path means within said shaft means communicating said compressor discharge area with said chamber of said sealing structure for supplying said flow of pressurized air to the latter; and
centrifugally responsive valve means carried by said shaft means for controlling said flow of pressurized air as a function of shaft means rotational speed;
wherein said compressor wheel defines a back face communicating with said discharge area, said turbo machine further including a turbine wheel mounted on said shaft means for rotation therewith, said compressor wheel and said turbine wheel being axially spaced apart in back-to-back relation to define a radially extending axial space therebetween, said housing including a partition member extending radially inwardly toward said shaft means within said space, said partition member defining an opening circumscribing said shaft means and cooperating with said back face to define a clearance space, a seal apparatus cooperating with said partition member and with said shaft means to substantially prevent fluid flow therebetween, said flow path means including a fluid flow passage opening to said clearance space and communicating said discharge area with said chamber of said sealing structure.

17. The invention of claim 16 wherein each of said compressor wheel and said turbine wheel define a shoulder confronting the respective shoulder of the other, said seal apparatus being annular and disposed upon the shoulders of said compressor wheel and turbine wheel, said seal apparatus defining a radially extending notch communicationg therethrough and opening to said clearance space, said notch defining said fluid flow passage.

18. The invention of claim 16 wherein said shaft means defines a cavity therein, the centrifugally responsive valve means being received in said cavity.

19. The invention of claim 18 wherein said cavity is annular and includes a radially outer wall, said shaft means defining a passage opening on said radially outer wall and communicating with said chamber of said sealing structure, said valve means moving between a first position spaced from said radially outer wall and a second position engaging said radially outer wall adjacent said passage opening in response to centrifugal force.

20. The invention of claim 19 wherein said valve means includes an elongate strip of resilient shape-retaining material extending circumferentially within said annular cavity.

21. The invention of claim 20 wherein said elongate strip defines a pair of opposite ends and in said first position a spiral shape within said annular cavity, said elongate strip being secured to said radially outer wall adjacent one of said pair of opposite ends, the other of said pair of opposite ends moving into and out of engagement with said radially outer wall in response to centrifugal force to move said valve means respectively between said first and said second positions.

22. The invention of claim 21 wherein said elongate strip is U-shaped in transverse cross section.

23. The invention of claim 21 wherein said one end of said elongate strip extends radially to define an abutment engageable by the other of said ends.

24. The invention of claim 20 wherein said elongate strip defines a pair of opposite ends both engaging said radially outer wall, said elongate strip being secured to said outer wall adjacent one of said pair of ends, the other of said pair of ends slidably engaging said outer wall, an intermediate portion of said elongate strip defining a radius greater than the radius of said outer wall, said intermediate portion moving radially into and out of engagement with said outer wall in response to centrifugal force to move said valve means respectively between said first and said second positions.

25. The invention of claim 20 wherein said elongate strip defines a pair of opposite ends, said elongate strip being formed into a circular shape with said pair of opposite ends secured to said outer wall adjacent to one another, an intermediate portion of said elongate strip in said first position of said valve means confronting said passage opening on said outer wall in spaced relation thereto, said elongate strip including a pair of elastic sections between said intermediate portion and said pair of opposite ends to allow relative movement therebetween, said intermediate portion moving radially outwardly in response to centrifugal force to engage said outer wall in said second position of said valve means.

26. A combustion turbine machine including structure having a housing defining an opening, a relatively rotatable shaft means received in said opening, and a seal apparatus circumscribing said shaft means and cooperating with said housing and said shaft means to substantially prevent leakage of a liquid through said opening in response to a flow of pressurized sealing fluid to said seal apparatus, and centrifugally responsive valve means upstream of said seal apparatus and rotating to control said sealing fluid flow as a function of rotational speed.

27. The method of controlling a flow of pressurized sealing fluid from a source thereof whose pressure level is a function of the rotational speed of a shaft means to a sealing apparatus cooperating with said shaft means and a housing to prevent leakage of another fluid therebetween, said method comprising the steps of:
forming flow path means within said shaft means for communicating said flow of sealing fluid from said source thereof to said seal apparatus;
disposing a centrifugally responsive valve element within said flow path means for rotation with said shaft means to control said flow of sealing fluid as a function of rotational speed of said shaft means; and
utilizing said flow of sealing fluid to said sealing apparatus to prevent leakage of said another fluid between said shaft means and said housing.

28. In a turbo machine having a housing journaling a shaft means, said shaft means carrying a compressor wheel discharging pressurized air to a discharge area; the method of forming a seal between said housing and said shaft means which is resistant to the leakage of a liquid therepast, said method comprising the steps of:
forming a sealing structure between said housing and said shaft means, said sealing structure resisting the leakage of said liquid therepast in response to a flow of pressurized air into a chamber of said sealing structure;
forming flow path means within said shaft means leading from said discharge area to said chamber of said sealing structure for communicating a flow of said pressurized air to the latter;
disposing a centrifugally responsive valve means in said flow path means for controlling said flow of pressurized air as a function of shaft means rotational speed; and
utilizing said flow of pressurized air to resist leakage of a liquid between said housing and shaft means at said seal structure.

29. The method of claim 16 wherein said step of disposing centrifugally responsive valve means includes:
forming a circumferentially extending annular chamber within said shaft means and substantially coaxial therewith, said annular chamber defining a part of said flow path means and including a radially outer circumferential wall, said outer wall defining a passage opening thereon and leading to said chamber of said sealing structure; and
disposing a circumferentially extending resilient element within said annular chamber, said resilient element including a portion which is yieldably biased radially inwardly to a first position spaced from said passage opening, said portion of said resilient element shifting radially outwardly to a seoond position wherein said portion spans said passage opening in response to centrifugal force.

30. The method claim 29 wherein said step of forming flow path means within said shaft means includes:
forming a clearance space extending radially inwardly from said discharge area toward said shaft means adjacent a back face of said compressor wheel;
forming a cavity within said shaft means communicating with said clearance space; and forming a passage within said shaft means communicating said cavity with said annular chamber.

31. The method of claim 30 wherein said step of forming a sealing structure includes:
  forming an axially extending circumferential surface on said shaft means;
  forming an axially and circumferentially extending wall part of said housing to define an opening receiving said shaft means, said wall being spaced radially outwardly of and confronting said shaft means to define an axially extending clearance therebetween;
  forming at least a pair of circumferentially extending and axially spaced apart knife-edge elements extending radially between said wall and shaft means for cooperating therewith to substantially define said chamber of said sealing structure, said sealing structure chamber circumscribing said shaft means.

32. The method of matching a flow of pressurized air from an air pressure generator whose pressure level is a function of a shaft means rotational speed to the air flow requirement of a shaft means sealing apparatus cooperating with said shaft means to block the leakage of a liquid therealong, said method comprising the steps of:
  forming a flow path communicating said flow of pressurized air within said shaft means to said sealing apparatus;
  disposing centrifugally responsive valve means in said shaft means for controlling said flow of pressurized air through said flow path as a function of rotational speed; and
  utilizing said flow of pressurized air to block leakage of said liquid along said shaft means at said sealing apparatus.

* * * * *